(12) United States Patent
Duch et al.

(10) Patent No.: US 9,328,771 B2
(45) Date of Patent: May 3, 2016

(54) HUB BEARING UNIT EQUIPPED WITH A LOW FRICTION SEALING ASSEMBLY

(71) Applicant: Aktiebolaget SKF, Göteborg (SE)

(72) Inventors: Daniele Duch, San Gillio (IT); Fausto Morello, Sommariva del Bosco (IT); Andrea Serafini, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 8 days.

(21) Appl. No.: 14/321,456

(22) Filed: Jul. 1, 2014

(65) Prior Publication Data
US 2015/0003766 A1 Jan. 1, 2015

(30) Foreign Application Priority Data

Jul. 1, 2013 (IT) .............................. TO2013A0548

(51) Int. Cl.
*F16C 33/78* (2006.01)
*F16C 33/80* (2006.01)
*B60B 27/00* (2006.01)
*F16C 19/04* (2006.01)
*F16C 19/18* (2006.01)

(52) U.S. Cl.
CPC ........... *F16C 33/805* (2013.01); *B60B 27/0073* (2013.01); *F16C 19/04* (2013.01); *F16C 33/783* (2013.01); *F16C 33/7879* (2013.01); *B60B 2900/5112* (2013.01); *B60B 2900/5114* (2013.01); *F16C 19/184* (2013.01); *F16C 2326/02* (2013.01)

(58) Field of Classification Search
CPC .. F16C 33/7879; F16C 33/7883; F16C 33/80; F16C 33/805

USPC .................... 384/480, 486, 544, 589
See application file for complete search history.

(56) References Cited

U.S. PATENT DOCUMENTS

| 8,303,190 | B2 | 11/2012 | Shigeoka | |
|---|---|---|---|---|
| 2008/0199120 | A1* | 8/2008 | Torii | F16C 19/186 384/480 |
| 2010/0129018 | A1* | 5/2010 | Shigeoka | B60B 27/0005 384/544 |
| 2010/0259014 | A1 | 10/2010 | Nakagawa | |
| 2012/0177315 | A1* | 7/2012 | Matsuki | B60B 27/0005 384/478 |

FOREIGN PATENT DOCUMENTS

EP 1902863 A2 3/2008
JP 2012154374 A 8/2012

* cited by examiner

*Primary Examiner* — Phillip A Johnson
(74) *Attorney, Agent, or Firm* — Bryan Peckjian; SKF USA Inc. Patent Dept.

(57) ABSTRACT

An assembly providing a first annular shield including a sleeve portion integral with a rotating member and with a flange portion, which radially extends to protrude from the first sleeve portion; a second annular shield having a sleeve portion integral with a stationary member and with a flange portion that radially extends to protrude on the opposite side of the sleeve portion of the first shield and facing the flange portion; and an annular seal, which the flange portion of the first shield ends with an L-shaped annular portion that protrudingly radially and axially extends out of an annular gap delimited between the rotating and stationary members to define an L-shaped channel in radial section having constant width and forming a first labyrinth seal; the channel leads into an annular recess, delimited between the second shield and a first lip of the annular seal without contacting the first shield.

11 Claims, 2 Drawing Sheets

HUB BEARING UNIT EQUIPPED WITH A LOW FRICTION SEALING ASSEMBLY

CROSS-REFERENCE TO RELATED APPLICATIONS

This application claims priority to Italian Patent Application TO2013A000548 filed Jul. 1, 2013, the contents of which are hereby fully incorporated by reference.

FIELD OF THE INVENTION

The present invention relates to a hub bearing unit having a low friction sealing assembly, in particular for equipping rolling bearings of hub bearing units of vehicles.

BACKGROUND OF THE INVENTION

Sealing assemblies intended to equip rolling bearings of hub bearing assemblies on the side of the flange which supports the wheel, so-called "outboard", such as for example those described in U.S. Pat. No. 8,303,190 and in US2012/0177315, are formed by so-called "cassette" seals including a first and a second annular shield, generally L-shaped in radial section, mounted one facing the other so as to delimit, between the shields, an annular chamber in which a series of sealing lips is arranged carried by an annular seal secured integral to one of the shields, generally the shield intended in use to remain stationary. Access to this chamber by external contaminants (water, mud, dust) is limited by a particular conformation of the flange portions of one or both of the shields, which also cooperate, in very close manner, with radially outer portions of the outer or inner ring of the bearing and/or with elements of the hub bearing integral therewith, thus forming labyrinth seals.

Nevertheless, to date, the passage of external contaminants into the chamber has been in any event excessive and therefore sealing lips are all to exert a sliding seal on respective sealing surfaces of the rotating shield (or surfaces integral therewith) obtained by providing significant interferences of the sliding lips, which lips may vary in shape and possibly be spring loaded. This increases friction in a currently unacceptable manner.

Furthermore, the complex conformation of the shields increases costs, makes assembly operations more difficult and above all, significantly increases bulks, in particular in axial direction, of the sealing assembly. The sealing assembly according to JP2012/154374A does not solve these problems.

SUMMARY OF THE INVENTION

It is the object of the present invention to provide a hub bearing unit having a sealing assembly of "cassette" type, which does not have the drawbacks described, is easy and affordable to embody, has increased protection efficiency of the rolling bodies, both reduced axial and radial bulks, and above all reduced friction. Therefore, based on the invention, a hub bearing unit having a sealing assembly is provided having the features stated in the appended claims.

According to the invention, realizing a labyrinth seal between the outer ring of the hub bearing unit, stationary in use, and the flange portion of the shield integral with the inner ring, rotating in use, of the hub bearing unit is obtained by forming a constant width L-shaped channel in radial section by means of a right angle folded radially outer edge of the flange portion and of the same flange portion, which delimit together with a radially outer lateral surface and a frontal flat surface of the outer ring, a first axial branch and a second radial branch of the L-shaped channel having comparable lengths and widths (i.e. in the same order of size), measured in radial direction for the first branch and in axial direction for the second branch. This surprisingly limits the entry of external contaminants between the two facing shields which form the sealing assembly, thus protecting the sealing lips. At least the radially outermost sealing lip may therefore be made not sliding, thus significantly limiting the friction, sealing efficiency being equal.

Sealing efficiency is also ensured by the realization on the flange portion of the shield integral with the rotating inner ring of a right angle intermediate fold defining in radial section an L facing on the opposite side of the L defined by the right angle folded edge of the flange portion; such an intermediate fold, which is made at the outlet of the constant width L-shaped channel into an annular recess defined by the radially outermost sealing lip, which is oblique, extends axially protruding over the concavity of the annular recess, so as to form a drip element adapted in use to guide any external contaminants which pass the first labyrinth seal defined by the L-shaped channel, into the annular recess.

BRIEF DESCRIPTION OF THE DRAWINGS

The present invention will now be described with reference to the accompanying drawings, which illustrate two non-limiting embodiments thereof, in which.

DETAILED DESCRIPTION OF THE INVENTION

Figure 1:
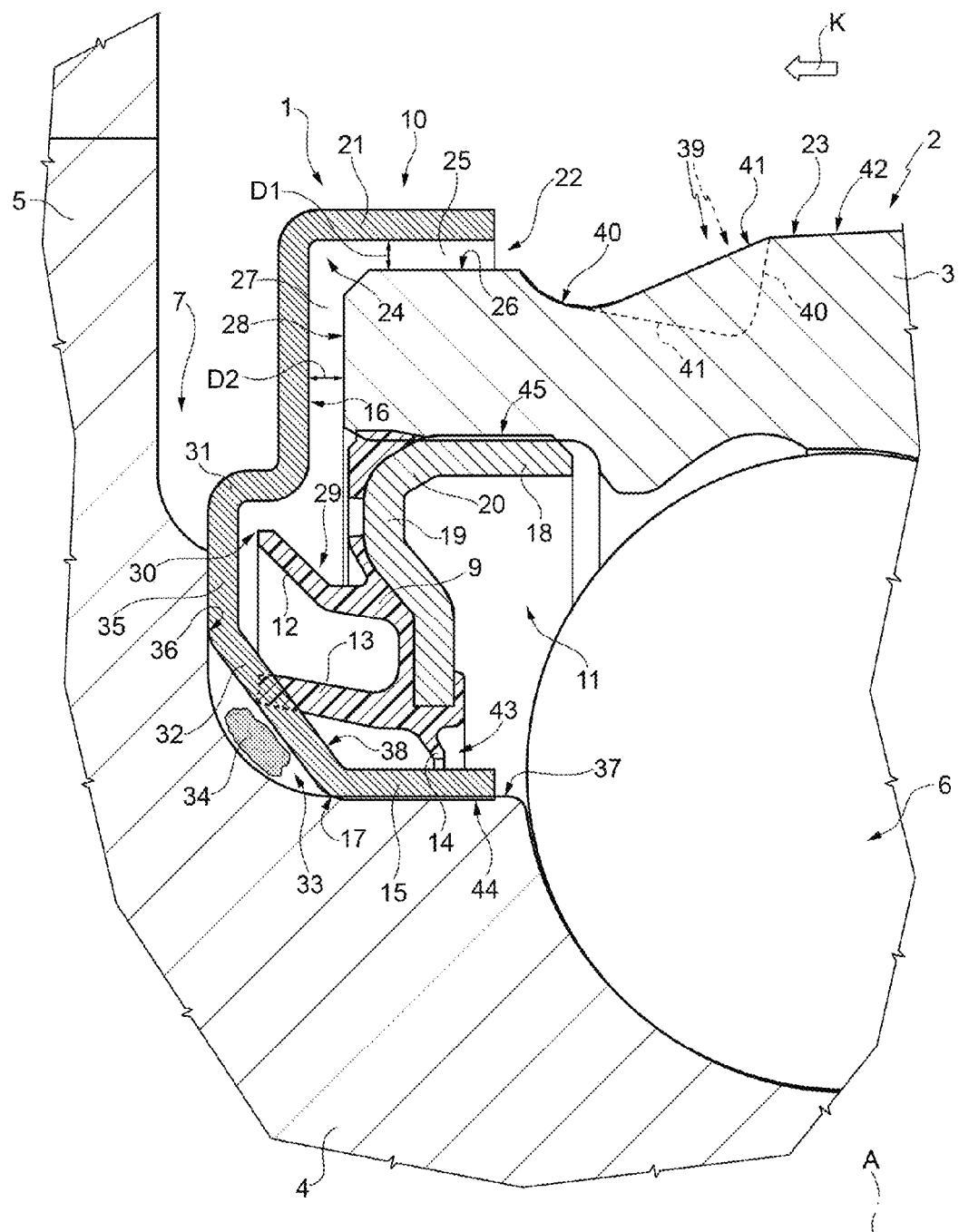
FIG. 1 diagrammatically illustrates a longitudinal elevation view in radial section of a first embodiment of the invention, showing a sealing assembly implemented on a hub bearing unit of known type and therefore which is illustrated only in part for simplicity.

Numeral 1 in FIG. 1 indicates a low friction sealing assembly, in particular devised to be mounted on a hub bearing unit 2 of a vehicle, of which hub bearing unit the sealing assembly 1 is an integral part in use.

The hub bearing unit 2, of known type, comprises an outer ring 3, stationary in use, an inner ring 4, rotating in use about an axis A, which is also the axis of symmetry of both the rings 3 and 4, and at least a crown of rolling bodies 6 interposed between the outer ring 3 and the inner ring 4, which are mutually coaxial; ring 4 has a flanged end 5 opposite to the outer ring 3 and intended to carry a wheel of a vehicle.

The sealing assembly 1 is insertable in an annular gap 7 delimited between the rotating inner ring 4 and the stationary outer ring 3 of the hub bearing 2 and, more generally, between the mutually coaxial rotating member 4 and the stationary member 3 of a generic rolling bearing of any known type, which is part of, or integrated with, the hub bearing unit 2.

The sealing assembly 1 is interposed between the rings 3 and 4, inserted in the annular gap 7 to protect the rolling bodies 6 arranged between the stationary member 3 and the rotating member 4, and comprises: a first annular shield 10 obtained by shearing and pressing a stainless steel plate, a second annular shield 11 also obtained by shearing and pressing a stainless steel plate, arranged facing shield 10, and an annular seal 9 made of one or more elastomeric materials, carried integrally by shield 11 and provided with a plurality of sealing lips 12, 13,14 which cooperate, as disclosed below, with shield 10 to fluid-tightly seal the annular gap 7 towards the rolling bodies 6.

Shield 10 is provided with a first sleeve, or more generally a cylindrical, portion 15 integral in use with the rotating member 4 and with a first flange portion 16, which radially extends so as to protrude from the sleeve portion 15 on the opposite side of axis A, hence radially towards the exterior, starting from an end 17 of the sleeve portion 15 facing the flanged end 5.

Shield 11 is provided with a second sleeve, or more generally a cylindrical, portion 18 integral in use with the stationary member 3 and with a second flange portion 19 carried by the sleeve portion 18 so as to protrude therefrom, radially on the opposite side of the flange portion 16 and facing the same; the flange portion 19 thus extends radially towards the interior, towards axis A and towards the sleeve portion 15, starting from an axial end 20 of the sleeve portion 18, facing shield 10 and the flanged end 5, in the non-limiting embodiment disclosed.

The lips 12 and 13 of the annular seal 9 axially and radially extend so as to protrude from the flange portion 19 towards the flange portion 16, obliquely to the flange portion 19, so as to move away from axis A; furthermore, the flange portion 16 ends on the opposite side of the sleeve portion 15 with a radially outer peripheral annular stretch 21 thereof, which protrudingly radially and axially extends in use out of the annular gap 7 to define a first labyrinth seal 22 with the stationary member 3.

In the case in point, the flange portion 16 extends in radial direction out of the annular gap 7, radially so as to protrude with respect to a radially outer lateral surface 23 of ring 3.

According to an aspect of the invention, the end annular stretch 21 thereof is defined/consists of a right angle folded edge of the flange portion 16 defining in radial section, with the rest of the flange portion 16, an L facing axis A. This right angle folded edge 21 delimits in use, in radial section, together with the flange portion 16 and the stationary member 3, an L-shaped channel 24 having, according to the main aspect of the invention, width substantially constant, but not necessarily equal, in radial and axial extension.

Channel 24 comprises a first branch 25 which forms the labyrinth seal 22 and which is delimited between the annular stretch or right angle folded edge 21 of the flange portion 16 and a first cylindrical stretch 26 of the lateral surface 23 of the outer ring 3, and a second branch 27 arranged at right angle with respect to branch 25, delimited between the flange portion 16 and a frontal flat surface 28 of the stationary member or outer ring 3 facing the rotating member or inner ring 4.

The term "substantially constant" herein and below means the fact that branch 25 has axial extension and has a constant radial width D1, while branch 27 has radial extension and has constant axial width D2 which is substantially equal to, or at least of the same order of size as, the radial width D1 of branch 25.

The L-shaped channel 24 leads into an annular recess 29 having concavity thereof facing the folded edge 21 and which is delimited between shield 11 and lip 12; lip 12 is the first radially outermost lip, i.e. most distant from axis A, of the annular seal 9 and extends obliquely with respect to the flange portion 16, so as to move away from the sleeve portion 15 to cooperate, according to the invention without contact, with the flange portion 16, with which it thus defines a second labyrinth seal 30.

According to a further aspect of the invention and in combination with that described above, the flange portion 16 has a right angle intermediate fold 31 defining in radial section an L facing on the opposite side of the L defined by the preferably right angle folded edge 21; fold 31 is arranged in a position facing the outlet in the annular recess 29 of the constant width L-shaped channel 24 and axially extends so as to protrude over the concavity of the annular recess 29, so as to form a drip element adapted in use to guide any external contaminants which pass the first labyrinth seal 22 into the annular recess 29.

Furthermore, according to the invention, the first branch 25 and the second branch 27 of the constant width L-shaped channel 24 have mutually comparable extensions in length, the first in axial direction and the second in radial direction (i.e. of the same order of magnitude) for example substantially identical or in any event similar, as in the non-limiting embodiment illustrated. The flange portion 16 ends on the side of the sleeve portion 15 with a second annular stretch 32 which is arranged obliquely with respect to the sleeve portion 15 and which axially extends on the side of the first annular stretch or right angle folded edge 21, so as to delimit a conic-truncated cavity 33 filled in use, on the opposite side of the sleeve portion 15, with a waterproof substance 34.

A third annular stretch 35 of the flange portion 16 is arranged between the second annular stretch 32 and the preferably right angle intermediate fold 31 and is made as a flat annular stretch adapted in use to abut against an axial shoulder 36 of the rotating member 4 (in the example illustrated defined by part of the flanged end 5) and is adapted to serve in turn as assembly shoulder for driving shield 10 onto a radially outer lateral cylindrical surface 37 of the rotating member defined by the inner ring 4.

In practice, the flange portion 16 is shaped so as to move away from the sleeve portion 15 in both axial (optional as for the specific example illustrated) and radial direction with the annular stretch 32, then continues perpendicular to the sleeve portion 15, moving away from the sleeve portion only in radial direction, with the annular stretch 35, approaches the sleeve portion 15 by means of fold 31, then moves away only in radial direction from the sleeve portion 15, thus extending parallel to the annular stretch 35, and ends with the right angle folded edge 21, which extends parallel to the sleeve portion 15 and in position facing the sleeve portion 15.

Thereby a significantly reduced axial bulk is obtained. Lip 13 is the second lip, proceeding in radial direction, of the annular seal 9 and, according to the invention, cooperates slidingly, fluid-tightly with the annular stretch 32, which defines, towards lip 13 and shield 11, a conic seal surface 38 tapering towards shield 11, i.e. that converges towards axis A on the side of shield 11.

In FIG. 1, lip 13 is illustrated out of scale for better comprehension, and partly by dotted line, in non-deformed configuration.

According to a non-secondary aspect of the invention, the sealing assembly 1 also comprises an annular groove 39 which is carried by the stationary member 3. The annular groove 39 is obtained on the lateral surface 23, which is generally cylindrical in shape, of the stationary member or outer ring 3, in a position adjacent to the angle folded edge 21 and is delimited, in axial direction, by a curved stretch 40 along which groove 39 deepens in a direction facing the rotating member 4 and axis A, and immediately in sequence, by a rectilinear stretch 41 defining an inclined plane along which the depth of groove 39 decreases to zero.

According to what is described, a hub bearing unit 2 made according to the invention comprises the sealing assembly 1 mounted in the manner described, interposed radially between the outer ring 3 and the inner ring 4 so that the flange portion 16 is axially arranged interposed in the annular gap 7 between the flanged end 5 and the outer ring 3, with the right angle folded edge 21 which axially and radially extends so as to protrude out from such an annular gap 7 and axially so as to protrude over the outer ring 3, parallel to and just spaced apart from the cylindrical stretch 26 of the radially outer lateral surface 23 of the outer ring 3; the right angle folded edge 21 extends axially towards the annular groove 39, which is obtained on the radially outer surface 23 of the outer ring 3, between the cylindrical stretch 26 and the second cylindrical stretch 42 of the radially outer surface 23, stretch 42 which is immediately adjacent to the cylindrical stretch 26; furthermore, the cylindrical stretch 42 has slightly larger diameter than the one of the cylindrical stretch 26.

The annular groove 39 is shaped so that the curved stretch 40 has the concavity thereof facing on the arrival side in use of the possible external contaminants, illustrated diagrammatically with an arrow K; the concavity of the curved stretch 40 is preferably facing on the opposite side of the rotating member 4, as illustrated with a solid line in FIG. 1. Groove 39 may however also have a different shape, in particular if the expected arrival direction of the contaminants is different, as illustrated with the dotted line in FIG. 1.

The third lip 14 of the annular seal 9 is a so-called grease-sealing lip, which obliquely extends towards the sleeve portion 15. Lip 14 cooperates preferably without sliding with the sleeve portion 15 to form a seal 43. The grease-sealing lip 14 may however also be made sliding on the sleeve portion 15.

The sleeve portions 15 and 18 are delimited by respective cylindrical coupling surfaces 44 and 45, respectively, which are driven in use onto the rotating member 4 and onto the stationary member 3. The sleeve portion 18 is coated with elastomeric material. An adequate quantity of waterproof substance is applied on surface 44, at the second annular stretch 32 of the flange portion 16, to increase the sealing action.

Figure 2:
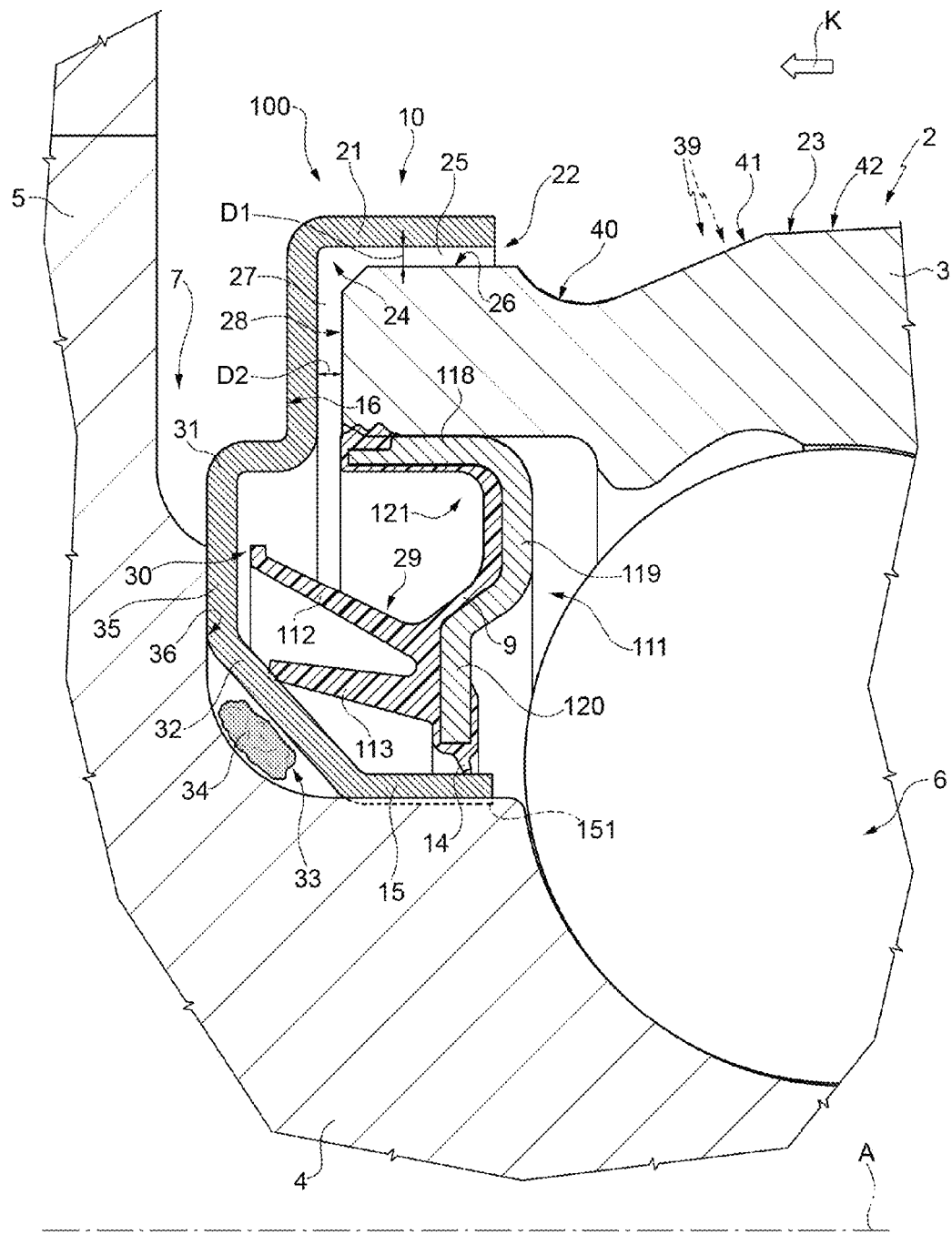
FIG. 2 diagrammatically illustrates in radial section a possible variant of the sealing assembly in FIG. 1, again implemented on a hub bearing unit of known type and therefore which is illustrated only in part for simplicity.

Now, with reference to FIG. 2, it illustrates a hub bearing unit 2 which is equipped with a sealing assembly 100 which depicts a possible variant of the sealing assembly 1 described above. Details similar or equal to those described above are indicated with the same numerals for simplicity.

The sealing assembly 100 comprises a shield 10 which is identical to the one of the sealing assembly 1, a shield 111 which replaces shield 11 and an annular seal 9.

Shield 111 comprises a sleeve portion 118 and a flange portion 119; the sleeve portion 118 axially extends so as to protrude from the flange portion 119 towards the first shield 10 and on the opposite side of the first sleeve portion 15 of shield 10.

The flange portion 119 ends on the opposite side of the sleeve portion 118 with an edge 120 folded towards the first shield 10 and from which edge 120 a first radially outermost lip 112 and a second lip 113, and also a grease-sealing lip 14, depart. Thereby, the flange portion 119, together with the preferably right angle intermediate fold 31 of the first flange portion 16, between the shields 10 and 111 and at an annular recess 29 delimited by lip 112, creates a water pocket 121 for any external contaminants which pass the first labyrinth seal 22.

An adequate quantity of waterproof substance is applied interposed between the inner ring 4 and shield 10, at the conic-truncated stretch 32.

The invention is not intended to be limited to the embodiments herein described and illustrated, which are to be considered as embodiments of the low friction sealing assembly, which are instead subject to further modifications related to shapes and arrangement of components, and construction and assembly details.

The invention claimed is:

1. A hub bearing unit comprising:
an outer ring that is a stationary member,
an inner ring that is a rotating member and having a flanged end opposite to the outer ring,
at least one crown of rolling bodies disposed between the outer ring and the inner ring, and
a low friction sealing assembly insertable into an annular gap delimited between the rotating member and the stationary member, mutually coaxial, of the hub bearing unit, to protect at least one crown of rolling bodies arranged between the stationary member and the rotating member; wherein
the low friction sealing assembly includes a first annular shield provided with a first sleeve portion integral with the rotating member, and with a first flange portion, which radially extends so as to protrude from the first sleeve portion; a second annular shield provided with a second sleeve portion integral with the stationary member and with a second flange portion supported by the second sleeve portion to protrude therefrom, radially on the opposite side of the first flange portion and facing the same; and an annular seal provided with at least a first and a second annular lip, which axially and radially extends to protrude from the second flange portion towards the first flange portion; and wherein
the first flange portion ends on the opposite side of the first sleeve portion with a first annular portion, which protrudingly radially and axially extends out of the annular gap to define a first labyrinth seal with the stationary member; wherein the first annular portion is defined by a right angle folded edge of the first flange portion defining, with the first flange portion, an L in radial section and together with the first flange portion and the stationary member, delimits an L-shaped channel in radial section having a substantially constant width and consisting of a first branch, delimited between the first annular portion and a cylindrical portion of a lateral surface of the stationary member and having constant axial extension and radial width (D1), and a second branch delimited between the first flange portion and a frontal flat surface of the stationary member facing the rotating member, having constant radial extension and axial width (D2) being comparable to the radial width of the first annular portion; the L-shaped channel leading into an annular recess having a concavity facing the right angle folded edge of the first flange portion and delimited between the second shield and the first lip of the annular seal, which first lip extends obliquely with respect to the first flange portion to cooperate with the first flange portion; wherein in combination:
i) the first lip extends to move away from the first sleeve portion and cooperates with the first flange portion without contact for defining with the first flange portion a second labyrinth seal;
ii) the first flange portion has a straight angle, intermediate fold defining an L in radial section, facing the opposite side of the L defined by the right angle folded edge of the first flange portion and extends, at the outlet into the annular recess of the constant width L-shaped channel, axially protruding over the concavity of the annular recess, to form a drip element adapted in use to guide any external contaminants which pass beyond the first labyrinth seal into the annular recess.

2. The hub bearing unit according to claim 1, wherein the second sleeve portion axially extends to protrude from the second flange portion towards the first shield and on the side opposite to the first sleeve portion of the first shield; the second flange portion ends on the side opposite to the second sleeve portion with an edge folded towards the first shield and from which the first and the second lips depart; and wherein the second flange portion, together with the right angle folded edge of the first flange portion, and between the first and the second shields and at the annular recess delimited by the first lip, creates a water pocket for any external contaminants that pass the first labyrinth seal and which are collected within the annular recess.

3. The hub bearing unit according to claim 1, wherein the first and the second branches of the constant width L-shaped channel have mutually comparable extensions in length, the first branch in axial direction and the second branch in radial direction.

4. The hub bearing unit according to claim 1, wherein the first flange portion ends on the side of the first sleeve portion with a second annular portion arranged obliquely with respect to the first sleeve portion and axially extends from the side of the right angle folded edge of the first flange portion defining a first annular stretch, to delimit a conic-truncated cavity filled with a waterproof substance on the side opposite to the first sleeve portion.

5. The hub bearing unit according to claim 4, further comprising a third annular portion of the first flange portion arranged between the second annular portion and the right angle folded edge of the first flange portion, the third annular portion being a flat portion arranged abutting against an axial shoulder of the rotating element and adapted to provide an assembly shoulder to drive the first shield onto a lateral cylindrical surface of the rotating element.

6. The hub bearing unit according to claim 4, wherein the second lip slidingly and fluid-tightly cooperates with the second annular portion of the first flange portion, which second annular portion, defines, towards the second lip, a conical sealing surface tapering towards the second shield.

7. The hub bearing unit according to claim 1, further comprising an annular groove formed on the lateral surface of the stationary member adjacent to the straight angle, intermediate fold of the first flange portion; the annular groove being delimited, in an axial direction, by a curved portion along which the groove deepens in a direction facing the rotating member, and immediately in sequence, by a rectilinear portion defining an inclined plane along which the depth of the groove decreases to zero.

8. The hub bearing unit according to claim 7, wherein the curved portion has a concavity facing towards the arrival side (K) in use of the possible external contaminants, and towards the opposite side of the rotating member.

9. The hub bearing unit according to claim 1, wherein the annular seal comprises a third grease-sealing lip, which obliquely extends towards the first sleeve portion.

10. The hub bearing unit according to claim 1, wherein the first and the second sleeve portions of the sealing assembly have respective coupling surfaces with the rotating member and the stationary member, and wherein on the coupling surface of the first sleeve portion a waterproof substance is applied.

11. The hub bearing unit according to claim 1, wherein the sealing assembly is radially mounted interposed between the outer ring and the inner ring, so that the first flange portion is axially arranged to be interposed in an annular gap between the flanged end and the outer ring, with the straight angle, intermediate fold of the first flange portion axially and radially extending to protrude out from the annular gap and axially to protrude over the outer ring, parallel to and spaced apart from a first cylindrical portion of a radially outer lateral surface of the outer ring; the right angle folded edge of the first flange portion extends axially toward an annular groove formed on a radially outer surface of the outer ring, between the first cylindrical portion and a second cylindrical portion immediately adjacent to the first cylindrical portion of the radially outer surface of the outer ring and having a diameter larger than that of the first cylindrical portion.

\* \* \* \* \*